Patented July 1, 1930

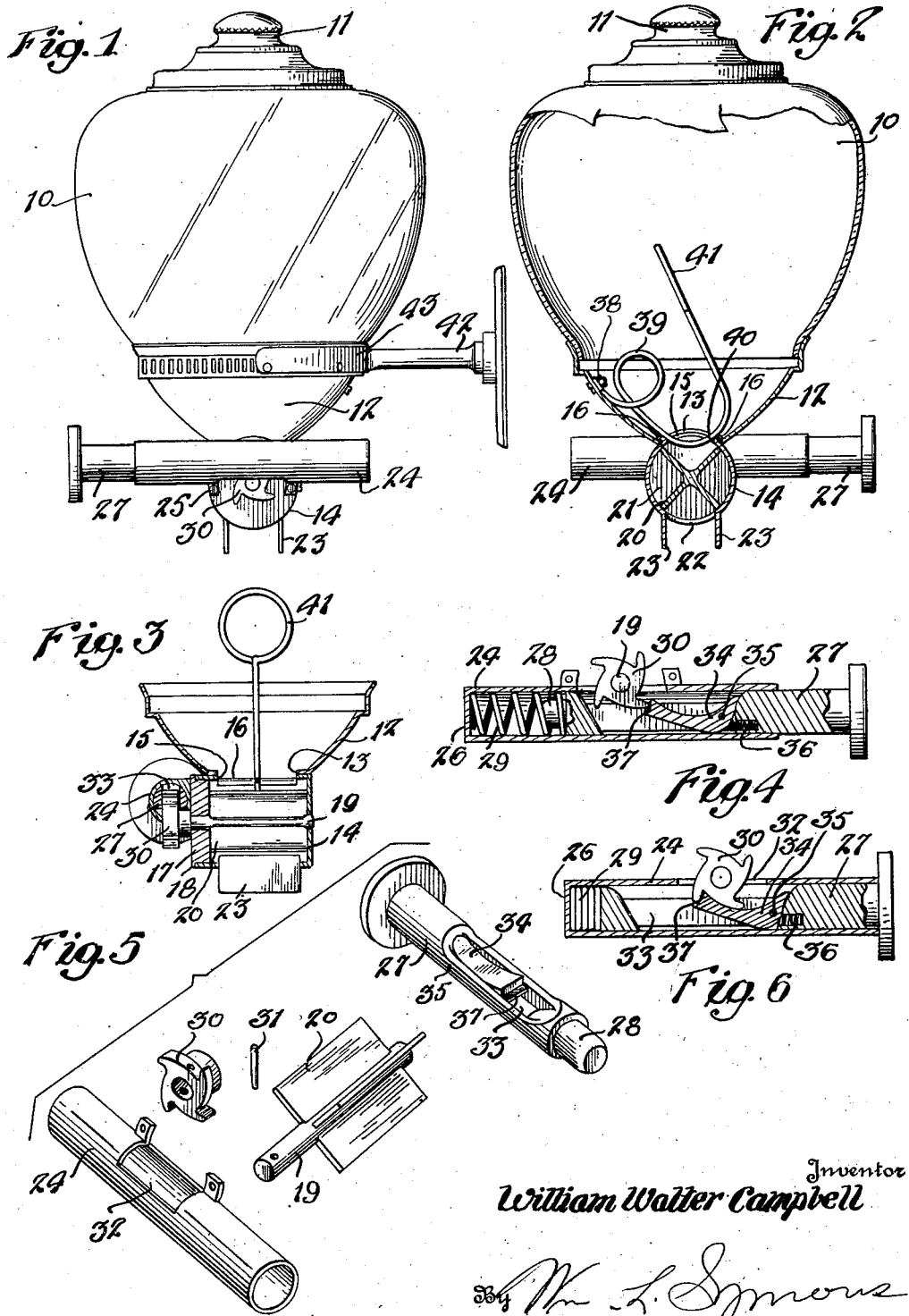

1,768,826

UNITED STATES PATENT OFFICE

WILLIAM W. CAMPBELL, OF SAN DIEGO, CALIFORNIA, ASSIGNOR OF ONE-HALF TO GROVER S. CAMPBELL, OF DENTON, TEXAS

DISPENSING AND MEASURING DEVICE

Application filed February 21, 1928. Serial No. 256,047.

My invention relates to improvements in dispensing and measuring devices, and more particularly to a device for dispensing a predetermined quantity of powdered soap, although not necessarily restricted to this use, as it may be applied to dispensing other materials.

An important object of my invention is to provide a device of this character which will automatically reset itself after the dispensing operation.

Another object of my invention is the provision of a device of the above-mentioned character with means for agitating the contents of the container during each dispensing operation.

A further object of my invention is to provide a device of this character which is simple of construction, inexpensive to manufacture, strong and durable.

Other objects and advantages of my invention will be apparent during the course of the following description.

In the accompanying drawings which form a part of this specification and wherein like characters of reference denote like or corresponding parts throughout the same, Figure 1 is a side elevation of a dispensing device embodying my invention, Figure 2 is a vertical central section therethrough, Figure 3 is a vertical sectional view through the dispensing cap and taken at right angles to Figure 2, Figure 4 is a longitudinal sectional view through the plunger casing showing the relation of the plunger to the ratchet wheel.

Figure 5 is a detail perspective view of the operating parts of the device, and, Figure 6 is a view similar to Figure 4 showing the plunger at the end of its stroke.

In the drawings wherein for the purpose of illustration is shown a preferred embodiment of my invention, the numeral 10 designates a container which is preferably of glass or the like, and which is provided at its upper end with a removable filling cap 11 preferably screw-threaded, and adapted to be removed to allow replenishing of the container's contents.

A cap member 12 is secured to the lower end of the container, and converges to a rectangular opening 13. A cylindrical casing or chamber 14 has a rectangular opening 15 adapted to correspond with the opening 13, the sides of the opening 13 being shaped to snugly fit the contour of the cylindrical chamber 14. The sides of the opening 15 are provided with integral flaps 16 which fit within the opening 13 and are pressed over the sides thereof to firmly secure the chamber 14 to the cap 12. This construction results in a snug, air-tight fit without soldering or welding.

The cylindrical chamber 14 has one end closed and the other open, and a disk 17 having a circumferential flange 18, is adapted to fit within the open end of the chamber 14, the flange 18 abutting against the end of the chamber. A shaft 19 has one end journaled in the end wall of the chamber 14 and the other end journaled in the disk 17, centrally thereof, the shaft extending through the disk and therebeyond. Vanes 20 are secured to or formed on the shaft 19 and extend radially therefrom to the walls of the cylindrical chamber. The vanes are shown in Figure 2 as four in number, thereby forming four pockets or chambers 21 of equal size, although this particular number of vanes is not essential. The vanes extend from the end wall of the cylindrical chamber 14 to the disk 17, and from the shaft 19 in the center of the chamber 14 to the walls thereof, thereby forming the pockets 21 which are practically air-tight and which have no communication one with the other. An opening 22 is arranged in the bottom of the cylindrical chamber 14 and is arranged diametrically opposite to the opening 15 and corresponds thereto in size and contour.

The distance between the ends of contiguous vanes is slightly greater than the width of the openings 15 and 22, and it will be seen that when one of the pockets 21 is in registration with the opening 15, another of the pockets is in registration with the opening 22. Rotation of the shaft one-quarter of a turn will bring the next pockets into alignment with the openings 15 and 22. Guide fins 23 depend from the sides of the opening 22 and may be formed integrally with the walls of the chamber 14 or they may be secured in any suitable manner.

A tubular sleeve 24 is detachably secured to the upper portion of the disk 17 exteriorly of the casing 14 by means of screws or the like 25 passing through lugs on the sleeve. The sleeve 24 has one of its ends closed at 26, and a plunger 27 is inserted through the open end of the sleeve and has a reduced extension 28 at its inner end adapted to fit within a coil spring 29 arranged in the closed end of the sleeve 24. The plunger 27 is of the same diameter as the inner circumference of the sleeve and is adapted to be pushed forward in said sleeve against the tension of the spring 29.

A ratchet wheel 30 is secured to the outer end of the shaft 19 by means of a pin 31 and is provided with suitable teeth corresponding in number with the number of vanes on the shaft. The ratchet wheel 30 projects through a slot or opening 32 in the lower side of the sleeve 24. The plunger 27 is provided with an elongated vertical slot 33 extending entirely therethrough, and the ratchet wheel 30 extends into said slot. A pawl 34 is pivoted within the slot adjacent its outer end at 35 and is engaged by a small coil spring 36 which normally forces the inner end of the pawl downwardly. The pawl is provided at its inner end with a flanged or stepped portion 37, and the lower surface of the pawl is sloped downwardly to form a thickened end portion. Figures 4 and 6 illustrate the relation of the pawl to the ratchet wheel, the plunger and sleeve being shown in an inverted position. Figure 4 illustrates the normal position of the plunger with the pawl pressed against one of the teeth on the ratchet wheel, the flanged portion 37 preventing the pawl from slipping past the tooth. When the plunger is forced inwardly the pawl is forced against the ratchet wheel and causes it to rotate, the tooth of the ratchet wheel pressing against the flange 37 and forcing the pawl upwardly against the tension of the spring 36. When the tooth engaging the pawl has passed its dead center, the spring 36 forces the pawl downwardly and when the plunger has reached the end of its stroke, the pawl and ratchet wheel will be in the position shown in Figure 6. When the plunger is released the pawl will be in the position shown in Figure 4. Where there are four vanes and four teeth on the ratchet wheel the shaft will have turned a quarter of a revolution, and different pockets 21 will correspond with the openings 15 and 22. It will be seen from Figure 2 that the contents of the container 10 will fill the upper pocket registering with the opening 15, and as the shaft 19 is rotated the pockets will be successively filled through the opening 15 and emptied through the opening 22.

In order to insure the proper feeding of the material in the container 10, I provide an agitator which is operated by rotation of the shaft 19. The agitator is preferably formed from a piece of spring wire having one end secured to the inside of the cap 12 at 38, is coiled about itself at 39 adjacent the securing member 38 and has a looped portion 40 normally extending through the opening 15 into the corresponding pocket 21. The end of the agitator extends above the cap 12 and terminates in a looped transverse member 41. When the shaft 19 is rotated, one of the vanes 20 forces the agitator out of the opening 15, and as the vane passes beneath the loop 40, the tension of the coil 39 returns the agitator to its normal position. This agitating movement is very abrupt and insures proper feeding of the powdered soap or other material to the pockets 21.

A supporting member 42 is provided with a yoke 43 adapted for connection with the container cap 12 and the member 42 is adapted to be secured to a wall or other support by means of one-way screws to prevent its removal.

The dispensing device may be operated with one hand by pressing the cupped hand against the plunger so that the palm of the hand will be below the opening 22 to receive the soap discharged by the action of the plunger, the fins 23 preventing the soap from scattering.

While I have shown and described the preferred embodiment of my invention, it is to be understood that various changes in the size, shape and arrangement of parts may be resorted to without departing from the spirit of my invention or the scope of the subjoined claims.

Having thus described my invention, what I claim and desire to protect by Letters Patent is:

1. A dispensing device for containers comprising a chamber having an inlet opening communicating with the interior of the container, and a discharge opening, a member having trunnions journaled for rotation in the end walls of the chamber, said member having a plurality of measuring compartments therein adapted for registration with the inlet and discharge openings, a ratchet wheel secured to the projecting trunnion exteriorly of the chamber and having equally spaced teeth of a number corresponding to the number of compartments in said rotatable member, a plunger slidably arranged exteriorly of said chamber and having an elongated slot to receive the ratchet wheel, and a pawl arranged in said slot and adapted to engage the teeth on said ratchet wheel whereby movement of the plunger will rotate said rotatable member to bring different compartments into alignment with the inlet and outlet openings.

2. A dispensing and measuring device for containers comprising a chamber having an inlet opening communicating with the interior of the container, and a discharge opening, a member having trunnions journaled for rotation in the end walls of the chamber, one of said trunnions extending exteriorly of the chamber, said member having a plurality of measuring compartments therein adapted for registration with said inlet and discharge openings, a ratchet wheel secured to the projecting trunning exteriorly of the chamber and having equally spaced teeth of a number corresponding to the number of compartments in said rotatable member, a plunger casing secured to said chamber and having a slot to receive the ratchet wheel, a plunger slidable longitudinally in said casing, resilient means in said casing normally forcing said plunger outwardly, said plunger having an elongated slot therein adapted to receive said ratchet wheel, said ratchet wheel serving to retain the plunger within the casing, and a spring pressed pawl pivotally secured within the plunger slot and engaging said ratchet wheel whereby inward movement of the plunger serves to rotate the measuring compartment member to bring different compartments into registration with the inlet and discharge openings.

In testimony whereof I affix my signature.

WILLIAM W. CAMPBELL.